United States Patent [19]

Nilsen et al.

[11] Patent Number: 4,794,613
[45] Date of Patent: Dec. 27, 1988

[54] LASER FLUID FLOW CONTROL APPARATUS AND METHOD

[75] Inventors: Carl J. Nilsen, Flanders; Joseph P. Wachter, Columbia; Ronald D. Young, Blairstown, all of N.J.

[73] Assignee: PRC Corporation, Landing, N.J.

[21] Appl. No.: 78,096

[22] Filed: Jul. 27, 1987

[51] Int. Cl.$^4$ ............................................. H01S 3/13
[52] U.S. Cl. ........................................ 372/58; 372/29; 372/33; 372/55
[58] Field of Search ..................... 372/58, 55, 29, 33

[56] References Cited

U.S. PATENT DOCUMENTS

| | | | |
|---|---|---|---|
| 3,509,486 | 4/1970 | Patel | 372/55 |
| 3,566,304 | 2/1971 | Neusel et al. | 372/59 |
| 3,605,036 | 9/1971 | Barnaby | 372/59 |
| 3,605,038 | 9/1971 | Byrne et al. | 372/55 |
| 3,641,455 | 2/1972 | Matovich | 372/59 |
| 3,648,194 | 3/1972 | Melikian et al. | 372/34 |
| 3,676,797 | 7/1972 | Kovacs | 372/55 |
| 3,704,428 | 11/1972 | Barry et al. | 372/55 |
| 3,745,482 | 7/1973 | Patel | 372/4 |
| 3,789,320 | 1/1974 | Hepburn | 372/58 |
| 3,876,957 | 4/1975 | Thatcher | 372/59 |
| 3,882,414 | 5/1975 | Jeffers et al. | 372/55 |
| 3,982,200 | 9/1976 | Hoag et al. | 372/55 |
| 4,196,399 | 4/1980 | Cason, III et al. | 372/58 |
| 4,210,877 | 7/1980 | Pleasance et al. | 372/55 |
| 4,283,686 | 8/1981 | Daugherty et al. | 372/58 |
| 4,417,340 | 11/1983 | Horiuchi et al. | 372/58 |
| 4,429,392 | 1/1984 | Yoshida et al. | 372/9 |
| 4,547,885 | 10/1985 | Allen et al. | 372/58 |
| 4,610,014 | 9/1986 | Martinen et al. | 372/59 |
| 4,661,958 | 4/1987 | Bowes et al. | 372/34 |

FOREIGN PATENT DOCUMENTS

| | | | |
|---|---|---|---|
| 0142688 | 11/1981 | Japan | 372/58 |
| 0023288 | 2/1982 | Japan | 372/55 |
| 58-223385 | 12/1983 | Japan . | |
| 0089478 | 5/1984 | Japan | 372/58 |
| 60-80285 | 5/1985 | Japan . | |
| 0115280 | 6/1985 | Japan | 372/58 |
| 60-211581 | 10/1985 | Japan . | |
| 1256398 | 12/1971 | United Kingdom . | |

Primary Examiner—William L. Sikes
Assistant Examiner—Xuan Thi Vo
Attorney, Agent, or Firm—Antonelli, Terry & Wands

[57] ABSTRACT

A laser fluid control apparatus and method provide selective, precise control of the fluid supplied to the laser. The flow of the fluid to the laser can be automatically adjusted according to a selected, programmed control to provide a high volume of the fluid to the laser during initial operation of the laser for a quick warm-up of the laser and a reduced volume after the laser has warmed-up for more economical operation of the laser. Different fluid mixes can also be provided for enhancing laser performance. A control for pulsed or continuous wave laser operation can be actuated to automatically change the composition of the fluid supplied to the laser for continuous wave laser operation as compared to that for pulsed operation.

34 Claims, 3 Drawing Sheets

LASER FLUID FLOW CONTROL APPARATUS AND METHOD

BACKGROUND AND SUMMARY OF THE INVENTION

The present invention is directed to a laser fluid control apparatus and method for precisely controlling the fluid flow to a laser. The volume and/or composition of the fluid supplied to the laser can be selectively and precisely varied during the operation of the laser by means of a programmable control means of the apparatus.

It is necessary to provide a fluid such as a gas to the resonator of a laser before the laser can be operated by exciting the gas within the cavity to produce a laser beam. Laser gas must also be supplied to the laser during the operation of the laser in order to replenish or maintain the gas within the laser for continued operation of the laser due to degradation and losses of the gas from, for example, vacuum leaks and chemical reactions which occur with the gas during the operation of the laser. The volume at which the gas is supplied to the laser and also its composition can effect operating characteristics of the laser, such as the power of the laser, and also the cost for operating the laser. It has been found that relatively long warm-up times for lasers reduce the efficiency or cost effectiveness of their use. Optimal gas mixes have also been found to vary for different power levels and modes of laser operation such as for laser pulse performance as compared to continuous wave laser operation.

An object of the present invention is to provide a fluid flow control apparatus and method for precisely controlling the flow of a fluid to a laser which enable the laser operator to readily enhance the laser performance and operating efficiency. More particularly, the invention allows the laser operator to select in advance or at any time during the operation of the laser the various fluid requirements for economy, fast warm-up time and laser performance by providing a programmable control means which the operator can initially set so that the apparatus automatically selectively and precisely varies the volume and/or the composition of the fluid supplied to the laser at predetermined time intervals during operation of the laser. Predetermined accurate adjustments in the volume and/or composition of the fluid being supplied to the laser can also be conveniently made by the operator with the control means during the operation of the laser.

According to a disclosed preferred embodiment, the fluid flow control apparatus of the invention for precisely controlling the flow of fluid to a laser from a supply of the fluid comprises fluid passage means extending between a supply of fluid and the laser, valve means located in the fluid passage means, the valve means being adjustable relative to the fluid passage means for controlling the flow of the fluid from the supply to the laser, and control means for adjusting the valve means and thereby the volume of the fluid supplied from the fluid supply to the laser. The apparatus and method may be used, for example, to provide a high volume of the fluid to the laser when the laser is cold for a quick warm-up of the laser and a reduced volume of the fluid to the laser after the laser has warmed-up for more economical operation of the laser. The control means provides the high volume of the fluid to the laser for a predetermined period of time before reducing the volume. The operator can manually override automatic timers of the apparatus as referred to below, or a computer could otherwise control the timers.

The control means in the disclosed embodiment adjusts the valve means to open and close or otherwise adjust the gas passage means at some frequency for controlling the volume of the fluid supplied to the laser. As a first frequency, the valve means is actuated to keep the passage means open during the entire predetermined period of time for warm-up of the laser for effecting the high volume of the fluid to the laser. This period of time is set by a first timer means of the apparatus. A second timer means adjusts the valve means to alternately close and open or otherwise adjust the fluid passage means to provide the reduced volume after expiration of the predetermined period of time. More particularly, the second timer means includes an OFF timer and an ON timer for respectively, alternately controlling the periods of time when the valve means closes and opens the fluid passage means. The operator can adjustably select at least the frequency that the ON timer maintains the valve means in a position to open the fluid passage means for varying the volume and/or composition of the fluid to the laser. The valve means in the disclosed embodiment is controlled by a variable frequency timer which controls at least one admit valve which is moved to open and close the fluid passage means by a solenoid which is actuated by the control means of the apparatus.

The fluid flow control apparatus further includes means for maintaining the fluid pressure in the laser substantially constant even during the adjustments in the volume and/or composition of the fluid being supplied to the laser. In the illustrated embodiment a working pressure control valve switches between two flow control valves to selectively direct the exhausted fluid through one of the two flow control valves to maintain the fluid pressure in the laser substantially constant even as the programmable control means of the invention selectively varies the volume and/or composition of the fluid being supplied to the laser.

The fluid which is supplied to the laser is typically a gas which is composed of several gases which are mixed by the apparatus before being supplied to the laser. The supply of the mixed gas itself can be controlled with the apparatus and according to the method of the invention or, as in the disclosed, preferred embodiment, the supplies of the several component gases of the laser gas are each separately controlled to conveniently permit variation of the composition, as well as the volume of the gas supplied to the laser. Thus, according to the disclosed embodiment, the apparatus includes a plurality of supplies of respective fluids and a plurality of respective passage means between the supplies and the laser. The valve means includes a plurality of respective valve means in respective ones of the plurality of passage means for controlling the fluids supplied to the laser from the supplies of fluids. The control means automatically adjusts the plrrality of valve means to control the respective fluids supplied to the laser from the plurality of supplies of fluids. A means for mixing a plurality of respective fluids together before the fluids are supplied to the laser resonator is provided. The apparatus also allows the operator to conveniently select special gas mixtures for pulsed or continuous wave modes of operation for the laser by actuating a switch on the apparatus to change the gas composition supplied to the laser.

The disclosed method of the invention involves selectively and precisely varying at least one of the volume and the composition of the fluid supplied to the laser. In one embodiment of the method this involves supplying a fluid at a relatively high volume to the laser during an initial operating period of the laser for a quick warm-up of the laser and supplying the fluid at a reduced volume to the laser after the laser has warmed up for economical operation of the laser. This method of the invention is particularly advantageous in that it can significantly reduce warm-up time and gas consumption.

Further, according to the method, the laser gas is supplied at the reduced volume by alternately opening and olosing at least one gas admit valve at predetermined time intervals in response to the operation of a programmable control means. The high volume of the fluid to the laser for warm-up and highest power output is provided by maintaining at least one gas admit valve open during the entire initial operating period of the laser. The reduced volume of the laser gas is predetermined by the operator or controller such as a computer by selectively adjusting the length of the time intervals which the at least one gas admit valve remains open relative to the time intervals it remains closed. This is accomplished with the programmable control means of the invention prior to initiation of operation of the laser. Alternatively, another's computer could be used to control the timers of the apparatus in the manner disclosed herein. Where several gases are controlled, the gas composition can also be programmed. The operator can change the composition of the gas to be supplied to the laser either prior to or during operation of the laser by selecting a continuous wave (CW) mode of operation, a pulsed mode of operation or other mode of operation for the laser. In the disclosed embodiment, selecting the pulsed mode of operation changes the N2 contnnt of gas supplied to the laser for improving the laser performance.

These and other objects, features and advantages of the present invention will become more apparent from the following description when taken in connection with the accompanying drawings, which show, for purposes of illustration only, one embodiment in accordance with the present invention.

DETAILED DESCRIPTION OF THE DISCLOSED EMBODIMENT

Figure 1:
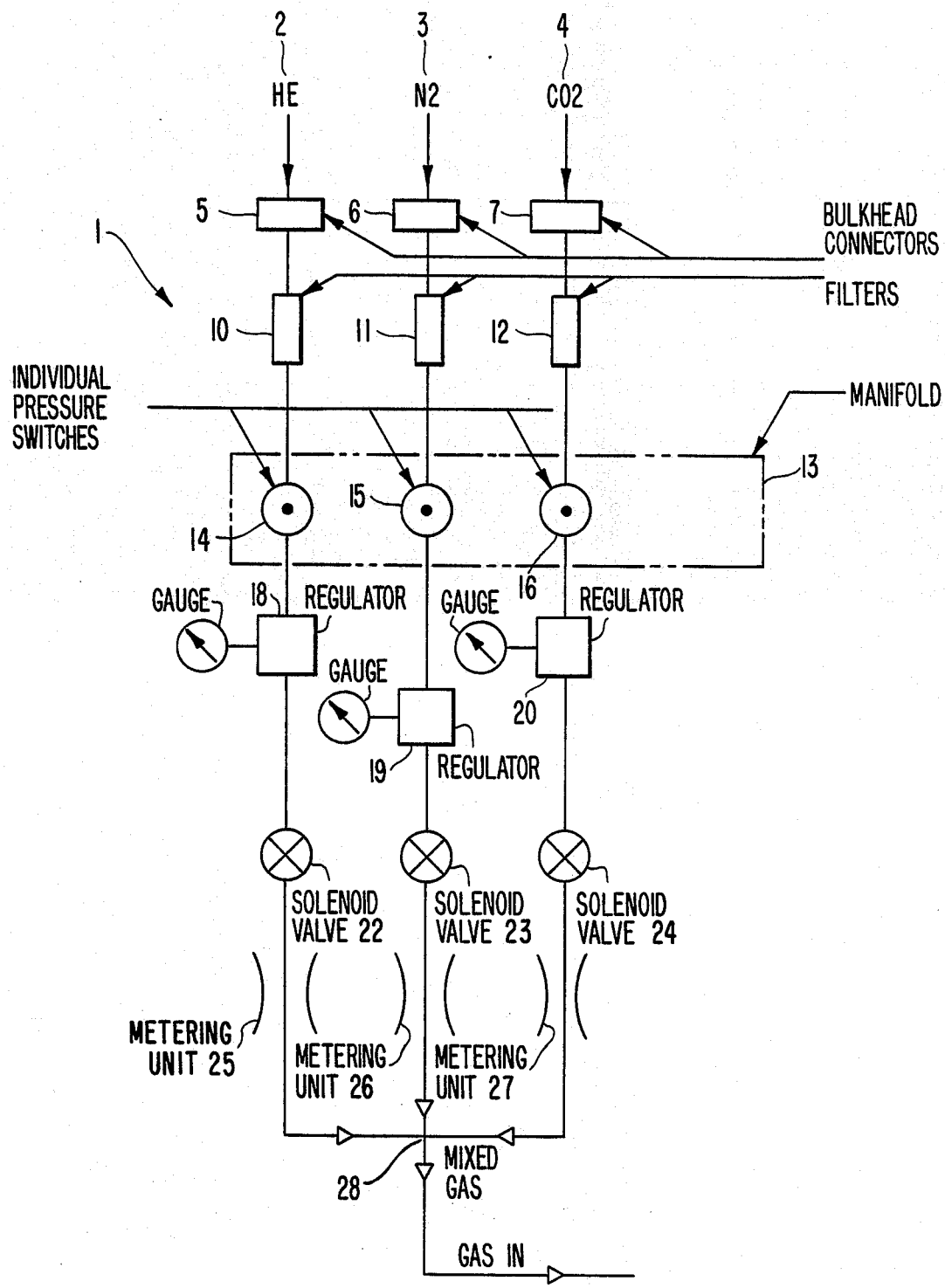
FIG. 1 is a schematic diagram of a fluid flow control apparatus according to a preferred embodiment of the present invention.

The laser fluid control apparatus 1 of the invention as illustrated in FIG. 1 is for precisely controlling the fluid, in this case gas, supplied to a laser from a supply of gas. The apparatus 1 comprises respective sources of gases, namely He, $N_2$ and $CO_2$ as identified by the reference numerals 2, 3 and 4 in FIG. 1. Other gases or fluids could, of course, be used depending on the type of laser and its operating requirements. The gases are conveyed through respective fluid passages in corresponding bulk head connectors 5, 6 and 7 of a laser control cabinet. Filters 10, 11 and 12 are provided for filtering the respective gases.

The gases move through their respective gas lines to a manifold 13. Individual pressure switches 14–16 are located in the respective fluid passages within the manifold 13. The switches are adapted to close if the pressures of the incoming gases do not exceed a required minimum. The laser operator is thus alerted to the problem of a low pressure supply of a particular gas and can correct the problem as by hooking up a new cylinder of the pressurized gas. Regulators 18, 19 and 20 with gauges or electronic readouts are provided in each gas line downstream of the manifold 13 for adjustably reducing the pressures of the incoming gases to a workable, predetermined level.

Solenoid valves 22, 23 and 24 provided in the He, $N_2$ and $CO_2$ gas lines downstream of the respective regulators 18–20 open and close the gas lines for controlling the flow of the gases toward the laser. Metering units 25, 26 and 27 in the gas lines below the solenoid valves 22, 23 and 24, determine the permissible maximum flow rates of the respective gases toward the laser. The metering units may, for example, be flow valves with adjustable throttles, adjustable orifice metering units such as an iris or an adjustable needle type valve or some other metering means which permit adjustment of the flow. Alternatively, the metering units may be fixed orifice flow valves wherein the orifice size is constant and the line pressure is varied as with a regulator to effect adjustments in the flow. The three gases, He, $N_2$ and $CO_2$ are mixed downstream of their respective metering units at a mixer shown schematically at 28. The mixed gases are then conveyed to an essentially closed gas loop 49 of the laser 42 within which the gases are circulated. In other types of lasers an open loop fluid circuit could be employed. The closed loop 49 includes a resonator 32, shown schematically in FIG. 2, wherein the gas is excited thereby producing a laser beam. The gas is circulated by a compressor 29 such as a Roots blower or turbine. Heat exchangers 30 and 31 are provided on respective sides of the blower 29 for cooling the circulating gas. This type of forced transport molecular gas laser is well known as evidenced by assignees' U.S. Pat. No. 4,622,675, for example. The gas is electrically or otherwise excited in the cavity 32 to cause it to lase. The light is reflected within the cavity 32 by means of a rear mirror 33, fold mirrors 34 and 35 and an output coupler 36 which is partially transmissive for releasing laser light from the resonator 32.

The laser gases circulating through the resonator 32, heat exchanger 30, compressor 29 and heat exchanger 31 are maintained at a relatively low operating pressure, e.g., a small fraction of an atmosphere such as 85 Torr by means of a vacuum pump 37. The pump 37 is connected to the essentially closed loop 49 of the laser by means of gas line 38 through a working pressure control valve 39 which is operated by means of a solenoid for exhausting gas from the closed laser loop through either a flow control valve 40 or a flow control valve 41. The two valves 40 and 41 permit different rates of exhaustion of gas from the laser by the vacuum pump 37. The working pressure control valve 39 switches between the two control valves 40 and 41 to maintain the laser system working pressure at a predetermined, substantially constant value during the operation of the laser. One of the valves 40 or 41 has a higher rate of exhaustion than the maximum flow of gas to the laser to permit a lowering of the pressure in the loop 49 even as gas is fed into the loop by the fluid control apparatus. The operation of the valve 39 to select either control valve 40 or 41 is controlled in response to the output of a gas pressure sensor 50 in the closed loop 49. This solenoid valve 39 could also be controlled by sensor 50 or another sensor in the loop 49.

Figure 2:
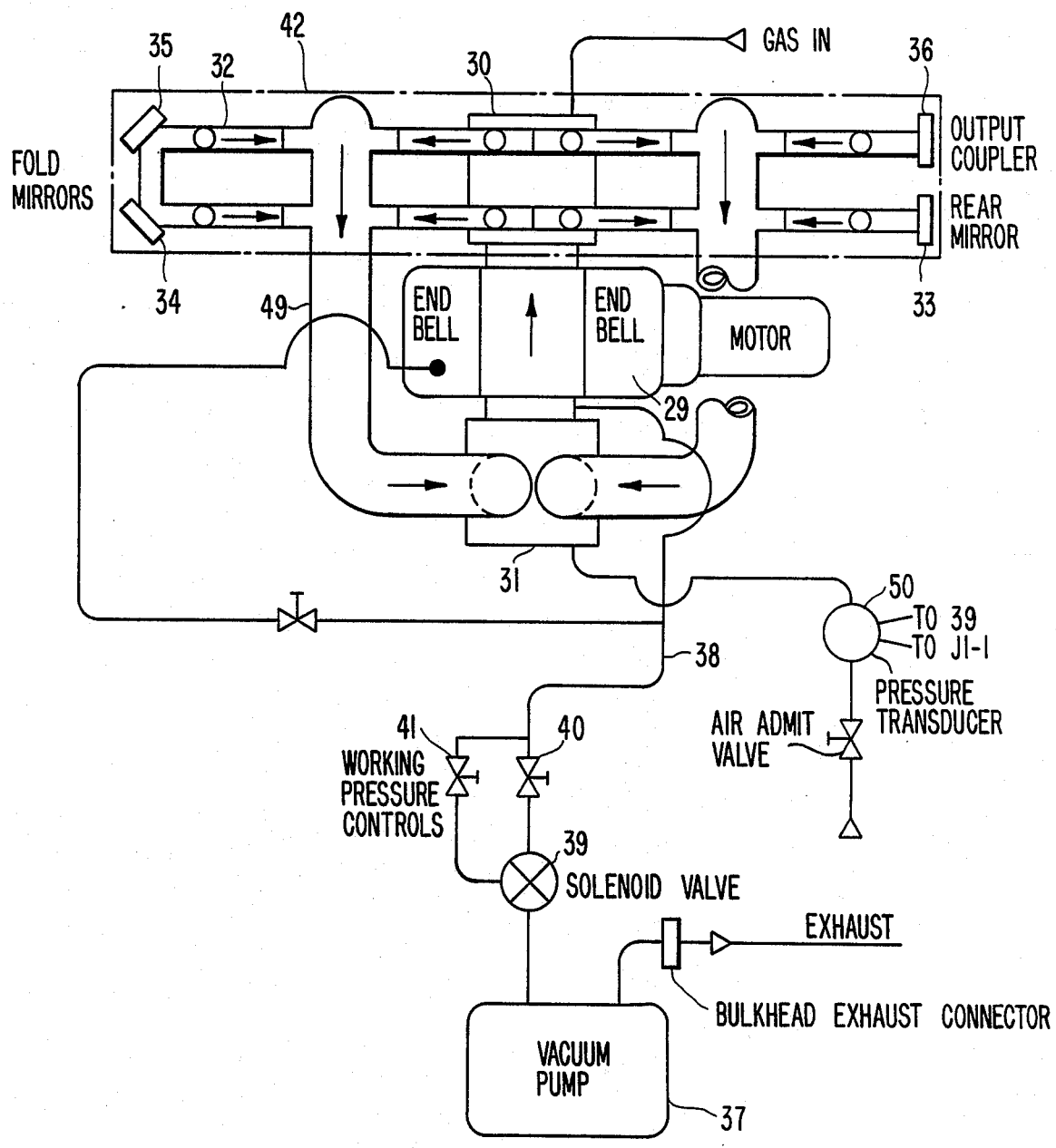
FIG. 2 is a schematic diagram of a gas laser with the fluid flow control apparatus of FIG. 1.
Figure 3:
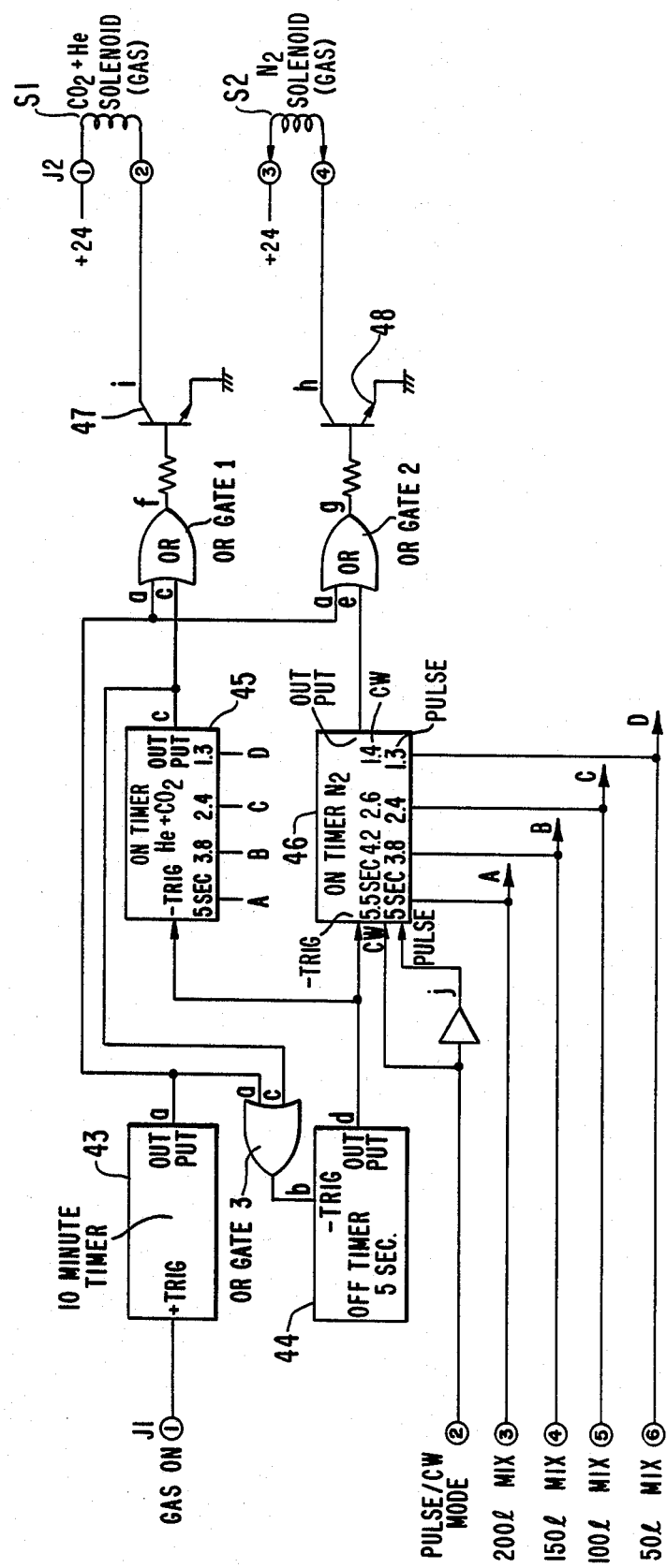
FIG. 3 is a diagram of the electrical system of the fluid flow control apparatus of FIG. 1.

A diagram of the electrical system for the laser gas flow control apparatus 1 is shown in FIG. 3 of the drawings. The control system permits the operator to select a high volume of the gas to be supplied to the laser as for example when the laser is cold or high power is required, and a reduced volume to the laser for economy at other times and/or after a predetermined warm-up period of, for example, 10 minutes. The more economical, reduced flow can be selected by the user of the laser before or during operation of the laser. The operator can also select the composition by adjusting the relative flows of the several gases. Referring to FIGS. 2 and 3, in operation of the laser fluid flow apparatus 1, when the laser 42 is first started, the vacuum pump 37 removes the atmosphere from the vacuum circuits. When a vacuum set point is reached, a pressure sensor 50 applies an electrical signal of, for example, 15 volts to J1-1 for initiating gas flow as discussed below. This triggers a 10-minute timer 43 whose output "a" goes high. This high output is applied to OR gate 1 and OR gate 2 to cause the outputs to go high. The high outputs of the OR gates 1 and 2 are in turn, applied to bipolar NPN transistors 47 and 48 to turn them on to allow current to flow through the solenoid coils S1 and S2, respectively. Current flow through S1 turns on gas admit solenoid valves 22 and 24 for helium and carbon dioxide (e.g., see FIG. 1), and current flow through coil S2 turns on the gas admit solenoid valve 23 for $N_2$. When the laser reaches its operating pressure as sensed by pressure sensor 50, a high voltage or other form of excitation is turned on and a laser beam is produced within the resonator 32 and emitted through the output coupler 36. The 10 minute timer 43 continues feeding a high volume of the gas, for example, the total gas flow of the mixed gases is 400 liters per hour, into the laser as the laser warms-up. This achieves a fast warm-up of the laser. Applicants have found that such a high volume of the gas into the laser can reduce warm-up time of the laser as compared with lower volumes. The high volume of gas flow per hour is a rich mix which not only provides the quickest warm-up of the laser, but also the highest power output of the laser. However, for most applications of the laser this rich a mixture is not necessary. Lower volumes of the gas can be used with only slight loss of power.

At the end of the 10-minute period of warm-up, the timer 43 output "a" goes low and gas flow to the laser is stopped as each of the solenoid valves 22, 23 and 24 is closed by stopping current flow through coils S1 and S2. At this time OR gate 3 triggers an OFF timer 44 (which has a −Trig triggered by a low output from OR gate 3) whose output "d" goes high for a short period, 5 seconds, for example, as set by the timer 44. At the end of the 5 second off period of the OFF timer 44, "d" goes low triggering an on-timer 45 (which has a −Trig triggered by a low output from OFF timer 44) for again actuating the flow of both helium and carbon dioxide and triggering an on-timer 46 (which also has a −Trig triggered by a low output from OFF timer 44) for actuating the flow of $N_2$ through OR gates 1 and 2, transistors 47 and 48 and coils S1 and S2.

The time periods during which the ON timers 45 and 46 remain on can be adjustably selected by the operator or other control by actuating one of the switches 3–6 on the control panel of the apparatus. If desired, separate switches could be provided for setting each of the ON timers 45 and 46 differently before operation of the laser. As shown in FIG. 3, four settings are provided on each on-timer which correspond to time periods for gas flow when the solenoid valves are open of 5 seconds, 3.8 seconds, 2.4 seconds and 1.3 seconds, respectively. During the time period of the ON timers 45 and 46, the respective gas admit solenoid valves 22, 23 and 24 are actuated to open the fluid passages and provide gas to the laser. They will remain open for the precise on-times which have been selected. After the ON timers have timed out, the outputs "c" and "e" thereof will go low and output "b" of OR gate 3 will then go low and trigger the OFF timer 44 again. This on-off operation continues in order to provide a precise control of the gas admitted by solenoid valves 22, 23 and 24 for optimizing gas economy and laser performance. The volume of the fluid supplied to the laser is of course a function of the relative duty cycle or frequency of operation of the respective timers.

In the disclosed embodiment the total reduced volume of fluid supplied after warm-up, when the ON timers 45 and 46 are set to have a 5 second timing period, is 200 liters per hour, at 3.8 seconds the flow rate is 150 liters per hour, at 2.4 seconds the volume is 100 liters per hour and at 1.3 seconds the volume is 50 liters per hour. These various flows occur while the off timing period of timer 44 remains set at 5 seconds.

In the illustrated arrangement, the OFF timer 44 is turned on by a negative "b" (b=0). A signal of 24 volts passes through the electrical coils S1 and S2 between 1 and 2 and between 3 and 4 for actuating the solenoid valves when the NPN transistors 47 and 48 become conductive in response to the outputs of the respective OR gates 1 and 2 as shown in the diagram of FIG. 3. Of course, these details are for purposes of illustration only, and other arrangements for triggering the timers and solenoids could, of course, be made.

J1-2 is a pulse/continuous wave mode select switch provided on the control panel of the apparatus. When continuous wave laser emission is selected, it allows the $N_2$ solenoid valve to be on a little longer than the He and $CO_2$ solenoid valves as the time periods of the on-timer 46 correspond to 5.5 seconds, 4.2 seconds, 2.6 seconds and 1.4 seconds, respectively, instead of the aforementioned time periods. This changes the composition of gas mix supplied to the laser without substantially changing the volume of the flow to thereby provide increased power for CW operation.

From the above discussion of the disclosed embodiment of the invention, it is seen that the fluid flow control apparatus of the invention allows the laser operator to program the apparatus by selecting a predetermined schedule of volumes of gas and/or gas compositions to be supplied to the laser during its operation. This enables the operator to operate the laser at any gas consumption that is desired from for example, 400 liters per hour down to a minimum level of gas consumption for laser operation. Variations of the volume of gas and/or composition can be predetermined before operation of the laser and in addition adjustments can be readily made in a precise manner during the operation of the laser. The invention allows the operator to cover up for vacuum leaks, e.g., air leaking into the system, reduce warm-up time of the laser, reduce gas consumption and employ different gas mixes to be used to optimize the laser performance. Moreover, the changes in the volume of fluid and composition can be made without concern for the laser operating fluid pressure which remains substantially constant because of the pressure control apparatus of the invention.

While we have shown and described one embodiment in accordance with the present invention, it is understood that the same is not limited thereto, but is susceptible to numerous changes and modifications as known to those skilled in the art. The terms fluid and gas as used herein are understood to encompass a single fluid or gas, as well as mixtures of several fluids or gases. The particular pressures and volumes or flows referred to here are not limiting, but are merely cited as examples of the operation of the fluid flow control apparatus and method of the invention. It is also envisioned that the method of the invention could be accomplished using a suitably programmed computer or microprocessor. The invention is applicable to lasers other than the specific type disclosed herein. Therefore, we do not wish to be limited to the details shown and described herein, but intend to cover all such changes and modification as are encompassed by the scope of the appended claims.

We claim:

1. In a fluid laser comprising means for supplying fluid to the laser and means for exciting the fluid in said laser to produce a laser beam, the improvement comprising, in combination, said means for supplying fluid to the laser including control means for selectively and precisely varying at least the volume of the fluid supplied to said laser, said control means producing a relatively high volume of the fluid to the laser for a predetermined period of time for quick warm-up of the laser and thereafter reducing the volume of fluid, and wherein said laser further includes pressure control means for maintaining the fluid pressure in the laser substantially constant even with changes in the volume of the fluid being supplied to the laser by said control means.

2. A laser according to claim 1, wherein said control mean is a programmable control means.

3. A laser according to claim 1, wherein said means for supplying fluid further comprises at least one supply of fluid, fluid passage means extending between said at least one supply of fluid and said laser, valve means located in said fluid passage means, said valve means being adjustable relative to said fluid passage means for controlling the volume of the fluid supplied from said at least one supply to said laser, said control means adjusting said valve means and thereby the volume of the fluid supplied from the at least one fluid supply to the laser.

4. A laser according to claim 3, wherein said control means adjusts said valve means to open and close said fluid passage means at a controlled frequency for controlling the volume of the fluid supplied to the laser.

5. A laser according to claim 3, wherein said control means include first timer means for adjusting said valve means for said predetermined period of time during which a relatively high volume of the fluid is supplied to the laser.

6. A laser according to claim 5, wherein said control means further includes second timer means for adjusting said valve means to supply a relatively reduced volume of fluid to the laser after expiration of said predetermined period of time.

7. A laser according to claim 6, wherein said second timer means includes an OFF timer and an ON timer for respectively, alternately controlling the periods of time when said valve means adjusts said fluid passage means.

8. A laser according to claim 7 wherein means are provided for adjustably selecting the period of time of at least one of said timers to permit variation in the volume of fluid supplied to the laser.

9. A laser according to claim 3, wherein said valve means is moved to open and close said fluid passage means by solenoid means actuated by said control means.

10. A laser according to claim 1, wherein said control means comprises means for adjusting the pressure of the fluid supplied to said laser for varying at least one of the volume and the composition of the fluid supplied to said laser.

11. A laser according to claim 1, wherein said pressure control means includes means for evacuating fluid from said laser to reduce the fluid pressure in said laser in preparation for operation of said laser, and means for detecting the fluid pressure in said laser, said control means initiating the flow of said fluid from a supply of said fluid to the laser when a predetermined fluid pressure in the laser is detected by said detecting means during evacuation.

12. A laser according to claim 1, wherein said means for supplying fluid to the laser comprises a plurality of supplies of respective fluids and a plurality of respective fluid passage means between said supplies and said laser, a plurality of respective valve means being provided in respective ones of said plurality of fluid passage means for controlling the fluid supplied to the laser from the respective supplies of fluids, said control means adjusting said plurality of valve means to control the volume of the respective fluids supplied to said laser from the plurality of supplies of fluids.

13. A laser according to claim 12, further comprising means for mixing the plurality of respective fluids together before said fluids are supplied to said laser.

14. A laser fluid control apparatus comprising at least one supply of fluid for a laser fluid passage means for conveying fluid from said at least one supply to a laser, and control means for selectively and precisely varying the volume of the fluid supplied to said laser through said fluid passage means from said at least one supply, said control means producing a relatively high volume of the fluid to the laser for a predetermined period of time for quick warm-up of the laser and thereafter reducing the volume of fluid, and further comprising pressure control means for maintaining the fluid pressure in the laser substantially constant even with changes in the volume of the fluid being supplied to the laser by said control means.

15. The apparatus according to claim 14, wherein said control means is a programmable control means.

16. The apparatus according to claim 14, wherein valve means are located in said fluid passage means, said valve means being adjustable relative to said fluid passage means for controlling the volume of the fluids supplied to said laser, said control means adjusting said valve means and thereby the volume of the fluid supplied to the laser.

17. The apparatus according to claim 16, wherein said control means adjusts said valve means to open and close said fluid passage means at a controlled frequency for controlling the volume of the fluid supplied to the laser.

18. The apparatus according to claim 16, wherein said control means includes first timer means for adjusting said valve means for said predetermined period of time during which a relatively high volume of the fluid is supplied to the laser.

19. The apparatus according to claim 18, wherein said control means further includes second timer means for adjusting said valve means to supply a relatively reduced volume of fluid to the laser after expiration of said predetermined period of time.

20. The apparatus according to claim 19, wherein said second timer means includes an OFF timer and an ON timer for respectively, alternately controlling the periods of times when said valve means adjusts said fluid passage means.

21. The apparatus according to claim 20, wherein means are provided for adjustably selecting the period of time of at least one of said timers to permit variation in the volume of fluids supplied to the laser.

22. The apparatus according to claim 16, wherein said valve means is moved to open and close said fluid passage means by solenoid means actuated by said control means.

23. The apparatus according to claim 14, wherein said control means comprises means for adjusting the pressure of the fluid supplied to said laser for varying at least one of the volume and the composition of the fluid supplied to said laser.

24. The apparatus according to claim 14, further comprising means for evacuating fluid from the laser to reduce the fluid pressure in the laser in preparation for operation of the laser, and means for detecting the fluid pressure in the laser, said control means initiating the flow of said fluid from said at least one supply of said fluid to the laser when a predetermined fluid pressure in the laser is detected by said detecting means during evacuation.

25. The apparatus according to claim 14, wherein a plurality of supplies of respective fluids and a plurality of respective fluid passage means are provided between said supplies and said laser, a plurality of respective valve means being provided in respective ones of said plurality of fluid passage means for controlling the fluids supplied to the laser from the respective supplies of fluid, said control means adjusting said plurality of valve means to control the volume of fluids supplied to said laser from the plurality of supplies of fluids.

26. The apparatus according to claim 25, further comprising means for mixing the plurality of respective fluids together before fluid is supplied to said laser.

27. In a method of operating a fluid laser comprising the steps of supplying fluid to the laser and exciting the fluid in the laser to produce a laser beam, the improvement comprising the step of selectively and precisely varying the volume of the fluid is supplied during an initial operating period of the laser or supplied to said laser so that a relatively high volume of fluid a quick warm-up of the laser and thereafter supplying a relatively lower volume of the fluid for more economical operation of the laser, and including the step of maintaining the fluid pressure in said laser substantially constant as the volume of fluid supplied to the laser is varied.

28. The method according to claim 27, wherein said step of selectively and precisely varying is performed by a programmable control means of the laser for varying at least one of the volume and the composition of the fluids supplied to the laser.

29. The method according to claim 27, including supplying said fluid to said laser by alternately adjusting the flow of the fluid to the laser at a predetermined frequency, said step of varying at least one of the volume and the composition of the fluids supplied to said laser including changing said frequency.

30. The method according to claim 29, wherein said adjusting of the flow is accomplished by alternately opening and closing at least one fluid admit valve at predetermined time intervals, said fluid valve being located in fluid passage means between a supply of said fluid and the laser.

31. The method according to claim 27, including the step of changing the composition of the fluids supplied to the laser for continuous wave operation of the laser as compared with the composition of the fluid supplied to the laser for pulsed operation of the laser.

32. The method according to claim 27, wherein the fluid pressure in the laser is maintained substantially constant by exhausting fluid from the laser through a working pressure control valve which selectively directs the exhaust fluid through one of two flow control valves to maintain the fluid pressure substantially constant.

33. The method according to claim 27, wherein a plurality of different fluids are supplied to the laser and the flow of each fluid to the laser is peecisely controlled for selectively and precisely varying at least one of the volume and composition of the fluids supplied to said laser.

34. The method according to claim 27, wherein said fluid is a mixture of fluids, the volume of which is precisely controlled.

* * * * *